United States Patent
Tenma et al.

(10) Patent No.: US 11,260,754 B2
(45) Date of Patent: Mar. 1, 2022

(54) ELECTRIC VEHICLE CONTROL DEVICE THAT CONTROLS ELECTRIC VEHICLE EQUIPPED WITH CHARGEABLE AND DISCHARGEABLE BATTERY AND ELECTRIC MOTOR THAT DRIVES DRIVING WHEEL BY BEING SUPPLIED WITH ELECTRIC POWER CHARGED IN BATTERY, AND ELECTRIC VEHICLE

(71) Applicant: ISUZU MOTORS LIMITED, Tokyo (JP)

(72) Inventors: Yuuki Tenma, Fujisawa (JP); Kiyoshi Takeuchi, Chigasaki (JP); Shigeki Iijima, Yokohama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 203 days.

(21) Appl. No.: 16/616,514

(22) PCT Filed: May 25, 2018

(86) PCT No.: PCT/JP2018/020092
§ 371 (c)(1),
(2) Date: Nov. 25, 2019

(87) PCT Pub. No.: WO2018/216790
PCT Pub. Date: Nov. 29, 2018

(65) Prior Publication Data
US 2020/0180469 A1 Jun. 11, 2020

(30) Foreign Application Priority Data

May 25, 2017 (JP) .............................. JP2017-103498

(51) Int. Cl.
*B60L 58/14* (2019.01)
*B60L 3/00* (2019.01)
(Continued)

(52) U.S. Cl.
CPC ................. *B60L 3/00* (2013.01); *B60L 50/60* (2019.02); *B60L 58/14* (2019.02); *H01M 10/44* (2013.01);
(Continued)

(58) Field of Classification Search
CPC ..... B60L 58/14; H02J 7/0048; H02J 7/00712; H01M 10/44; H01M 10/48; H01M 2220/20
(Continued)

(56) References Cited

U.S. PATENT DOCUMENTS

2013/0009764 A1* 1/2013 Yamamoto .............. B60L 58/12
340/449

FOREIGN PATENT DOCUMENTS

JP 2010-230499 A 10/2010
JP 4876773 B2 12/2011
(Continued)

OTHER PUBLICATIONS

JP2016-132263 Machine Translation performed on Aug. 13, 2021, 37 pages (Year: 2016).*
(Continued)

*Primary Examiner* — Nathaniel R Pelton
(74) *Attorney, Agent, or Firm* — Brundidge & Stanger, P.C.

(57) ABSTRACT

This control device for an electric vehicle is provided with: a discharge control unit which, when the electric vehicle has been turned off, if the SOC of the battery is within a prescribed range in which the battery is prone to deteriorate, performs control for discharging the battery until the SOC has left the prescribed range; a travelable distance calculation unit which calculates the travelable distance of the electric vehicle using the SOC and a travel coefficient; and a travel coefficient correction unit which, before and after (Continued)

performing control for discharging the battery is performed by the discharge control unit, corrects the travel coefficient such that the travelable distance calculated by the travelable distance calculation unit is reduced.

5 Claims, 4 Drawing Sheets

(51) Int. Cl.
*H02J 7/00* (2006.01)
*H01M 10/44* (2006.01)
*H01M 10/48* (2006.01)
*B60L 50/60* (2019.01)

(52) U.S. Cl.
CPC ........... *H01M 10/48* (2013.01); *H02J 7/0048* (2020.01); *H02J 7/00712* (2020.01); *H01M 2220/20* (2013.01)

(58) Field of Classification Search
USPC .......................................................... 320/136
See application file for complete search history.

(56) References Cited

FOREIGN PATENT DOCUMENTS

| | | |
|---|---|---|
| JP | 2013-158113 A | 8/2013 |
| JP | 2016-132263 A | 7/2016 |
| WO | 2012/049756 A1 | 4/2012 |

OTHER PUBLICATIONS

JP2013-158113 Machine Translation performed on Aug. 13, 2021, 46 pages (Year: 2013).*
International Search Report from International Application No. PCT/JP2018/020092 dated Aug. 7, 2018.

* cited by examiner

ELECTRIC VEHICLE CONTROL DEVICE THAT CONTROLS ELECTRIC VEHICLE EQUIPPED WITH CHARGEABLE AND DISCHARGEABLE BATTERY AND ELECTRIC MOTOR THAT DRIVES DRIVING WHEEL BY BEING SUPPLIED WITH ELECTRIC POWER CHARGED IN BATTERY, AND ELECTRIC VEHICLE

TECHNICAL FIELD

The present disclosure relates to an electric vehicle control apparatus and electric vehicle.

BACKGROUND ART

To be able to reduce environmental pollution caused by vehicle emissions and deal with limited petroleum resources, there are attempts to use alternative power sources different from traditional internal combustion engines (hereinafter referred to as engines) as automotive power sources. A representative example of this is an electric vehicle. The electric vehicle drives a motor using electric power charged in a battery and uses a driving force of the motor as an automotive power source.

Such electric vehicles are roughly classified into pure electric vehicles that only use battery power as a power source and hybrid electric vehicles (HEV) that are equipped with an internal combustion engine and use power generated by the engine to charge a battery and/or drive the vehicle.

Incidentally, the batteries used for electric vehicles are reduced in capacity due to secular changes. The capacity reduction (hereinafter also referred to as deterioration) tends to progress when a state of charge (SOC) of the battery is within a predetermined range. In particular, there is a problem in that battery deterioration progresses relatively quickly when the SOC is in the predetermined range when the electric vehicle is in a key-off state (a state in which the main power is off).

In connection with the above problem, a technique has been proposed that controls discharging until getting out of a predetermined voltage value after a key is turned off with a battery charged to the predetermined voltage value at which deterioration of the battery (power storage section 7) readily progresses (see, for example, Patent Literature (hereinafter abbreviated as PTL) 1). Also, a technique has been proposed that prevents deterioration of a battery, by controlling discharging based on the SOC when vehicle speed is zero and a shift lever is placed in a park position (see, for example, PTL 2).

CITATION LIST

Patent Literature

PTL 1
Japanese Patent No. 4876773
PTL 2
Japanese Patent Application Laid-Open No. 2016-132263

SUMMARY OF INVENTION

Technical Problem

However, when discharging is controlled to reduce the time for which the SOC is in the predetermined range in which battery deterioration readily progresses as with the technique described in PTLs 1 and 2, the distance to empty based on the SOC decreases with decreases in the SOC. As a result, there is a problem in that a driver might misrecognize that there is something wrong with the electric vehicle. Even when the driver does not recognize that there is something wrong, a change in the distance to empty might make the driver feel odd.

An object of the present disclosure is to provide an electric vehicle control apparatus and electric vehicle that can decrease the possibility that a driver will misrecognize that there is something wrong with the electric vehicle even when battery discharge control is performed when a key of the electric vehicle is turned off.

Solution to Problem

An electric vehicle control apparatus according to the present disclosure is an apparatus that controls an electric vehicle equipped with a chargeable and dischargeable battery and an electric motor that drives a driving wheel by being supplied with electric power charged in the battery, the electric vehicle control apparatus including:

a discharge control section that performs, when a state of charge (SOC) of the battery is in a predetermined range in which the battery is liable to deterioration, in a case where a key of the electric vehicle is turned off, control of discharging the battery until the SOC falls outside the predetermined range;

a distance-to-empty calculation section that calculates a distance to empty for the electric vehicle, using the SOC and a running factor; and a running factor correction section that corrects the running factor to reduce changes in the distance to empty calculated by the distance-to-empty calculation section when the changes are compared before and after the control of discharging the battery is performed by the discharge control section.

An electric vehicle according to the present disclosure includes the electric vehicle control apparatus described above.

Advantageous Effect of Invention

The present disclosure makes it possible to decrease the possibility that a driver will misrecognize that there is something wrong with the electric vehicle even when battery discharge control is performed when the key of the electric vehicle is turned off.

DESCRIPTION OF EMBODIMENT

Figure 1:
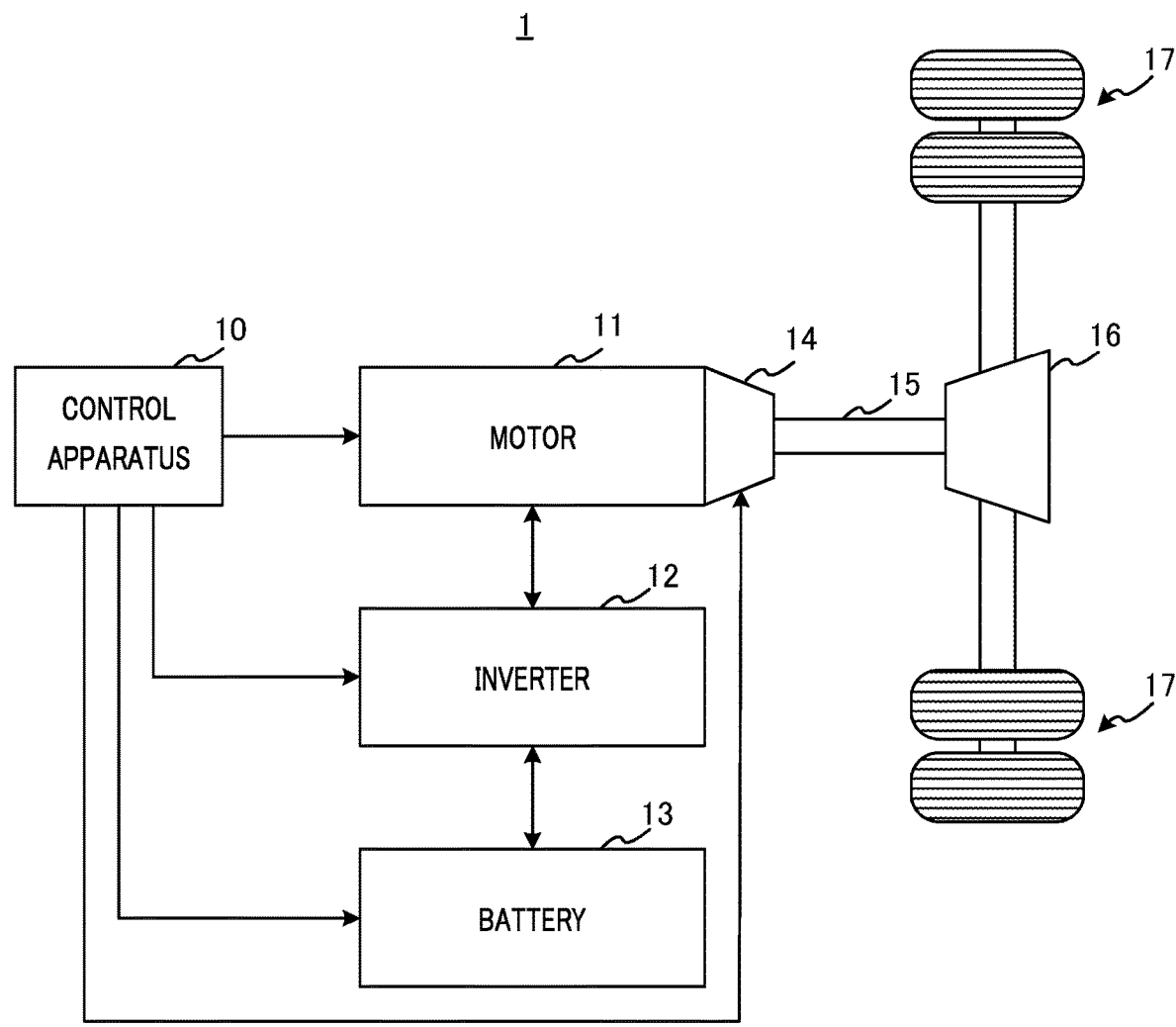
FIG. 1 shows a configuration of an electric vehicle according to an embodiment.

An embodiment of the present disclosure will be described below with reference to the accompanying drawings. FIG. 1 shows a configuration of an electric vehicle according the embodiment.

As shown in FIG. 1, electric vehicle 1 includes control apparatus 10 (which corresponds to an "electric vehicle control apparatus" of the present disclosure), motor 11, inverter 12, battery 13, transmission 14, propeller shaft 15, differential gear assembly 16, and driving wheels 17.

Control apparatus 10 controls operation of motor 11, inverter 12, battery 13, and transmission 14. Note that motor 11, inverter 12, battery 13, and transmission 14 may be controlled, for example, by ECUs (Electric Control Units) in collaboration with one another through CAN (Control Area Network) communications, with the ECUs being provided separately, but in the description of the embodiment, it is assumed that the components are controlled by single control apparatus 10.

Control apparatus 10 includes a CPU (Central Processing Unit), a ROM (Read Only Memory) storing a control program, and a working memory such as a RAM (Random Access Memory). The CPU reads the control program out of the ROM, loads the control program into the RAM and centrally controls operation of motor 11, inverter 12, battery 13, and transmission 14 in collaboration with the loaded control program.

Motor 11 rotates using electric power supplied from chargeable and dischargeable battery 13 and outputs driving torque of the electric vehicle to propeller shaft 15 via transmission 14. The driving torque outputted by motor 11 is transmitted to driving wheels 17 via propeller shaft 15 and differential gear assembly 16.

When requested by control apparatus 10 to drive motor 11, inverter 12 converts DC power of battery 13 into 3-phase AC power and supplies the AC power to motor 11. When requested by control apparatus 10 to drive motor 11, battery 13 supplies electric power to motor 11 via inverter 12.

Transmission 14, which is an automatic transmission such as an AMT (Automated Manual Transmission) or torque converter AT (Automatic Transmission), or a manual transmission, includes a transmission mechanism that connects or disconnects an output shaft of motor 11 and propeller shaft 15.

Figure 2:
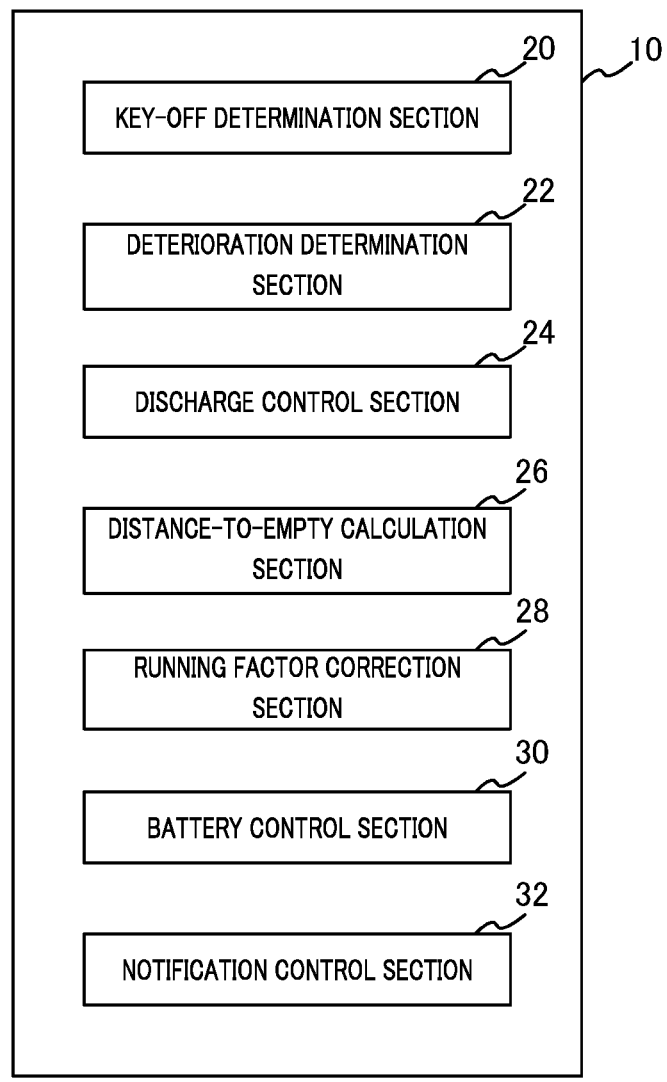
FIG. 2 is a block diagram showing a configuration made up of major functions of a control apparatus according to an embodiment.

FIG. 2 is a block diagram showing a configuration made up of major functions of control apparatus 10 according to the embodiment. As shown in FIG. 2, control apparatus 10 includes key-off determination section 20, deterioration determination section 22, discharge control section 24, distance-to-empty calculation section 26, running factor correction section 28, battery control section 30, and notification control section 32.

Key-off determination section 20 determines whether electric vehicle 1 is in a key-off state.

Figure 3:
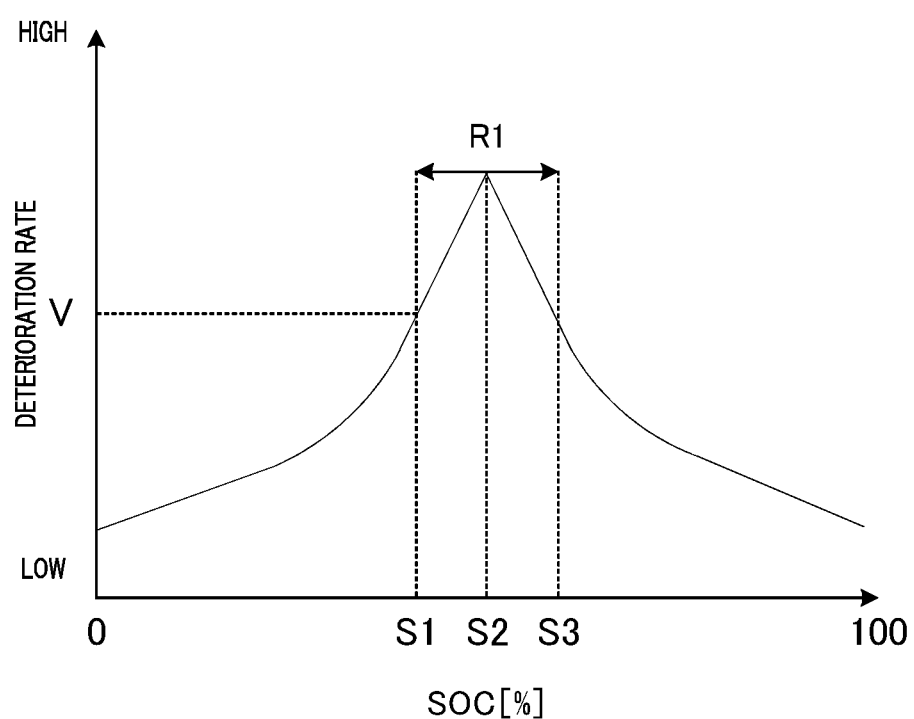
FIG. 3 shows a relationship between a SOC of a battery and a deterioration rate of the battery.

Deterioration determination section 22 determines whether a SOC of battery 13 is in predetermined range R1 (see FIG. 3) in which battery 13 is liable to deterioration. FIG. 3 shows a relationship between the SOC of battery 13 and a deterioration rate of battery 13. As shown in FIG. 3, when the SOC of battery 13 increases from zero [%] to S1 [%] and to S2 [%], the deterioration rate of battery 13 also increases, while on the other hand, when the SOC of battery 13 increases from S2 [%] to S3 [%] and to 100[%], the deterioration rate of battery 13 decreases. Deterioration (capacity reduction due to secular changes) of battery 13 tends to progress when the SOC of battery 13 is in predetermined range R1 (S1 to S3), that is, when the deterioration rate of battery 13 is equal to or higher than predetermined rate V. In particular, when the SOC is in predetermined range R1 when electric vehicle 1 is in a key-off state, deterioration of battery 13 progresses relatively quickly.

When it is determined by key-off determination section 20 that electric vehicle 1 is in a key-off state and it is determined by deterioration determination section 22 that the SOC of battery 13 is in predetermined range R1, discharge control section 24 performs control of discharging battery 13 until the SOC falls outside predetermined range R1. For example, discharge control section 24 performs control of discharging battery 13 by supplying electric power from battery 13 of electric vehicle 1 into a house as a domestic power supply.

Distance-to-empty calculation section 26 calculates the distance to empty for electric vehicle 1 using the SOC of battery 13 and a running factor (factor used for multiplication in calculating the distance to empty). That is, by multiplying the SOC of battery 13 by the running factor, distance-to-empty calculation section 26 calculates the distance to empty for electric vehicle 1. The distance to empty calculated by distance-to-empty calculation section 26 is displayed together with various information (for example, current speed of electric vehicle 1) on a display unit (not shown) installed inside electric vehicle 1.

Running factor correction section 28 corrects the running factor in such a way as to reduce changes in the distance to empty calculated by distance-to-empty calculation section 26 when the changes are compared before and after control is performed by discharge control section 24 to discharge battery 13. When the running factor is not corrected, the distance to empty calculated by distance-to-empty calculation section 26 decreases with decreases in the SOC when compared before and after control is performed by discharge control section 24 to discharge battery 13. As a result, a driver might misrecognize that there is something wrong with electric vehicle 1. Even when the driver does not recognize that there is something wrong, a change in the distance to empty might make the driver feel odd. Thus, according to the present embodiment, running factor correction section 28 corrects and thereby increases the running factor in such a way as to reduce changes in the distance to empty when the changes are compared before and after control is performed to discharge battery 13. Note that from the viewpoint of eliminating the possibility that the driver will misrecognize that there is something wrong with electric vehicle 1, desirably the running factor is corrected such that the distance to empty calculated by distance-to-empty calculation section 26 will remain unchanged when the distance to empty is compared before and after control is performed by discharge control section 24 to discharge battery 13.

When control is performed by discharge control section 24 to discharge battery 13, battery control section 30 decreases a lower limit of an operating range of the SOC of battery 13. This makes it possible to prevent the distance to empty based on the SOC from decreasing with decreases in the SOC when discharging is controlled to reduce the time for which the SOC is in predetermined range R1 in which deterioration of battery 13 readily progresses. Note that from the viewpoint of completely eliminating decreases in the distance to empty due to decreases in the SOC, desirably the lower limit of the operating range of the SOC of battery 13 is decreased by the amount of deviation of the SOC from predetermined range R1.

When it is determined by key-off determination section 20 that electric vehicle 1 is in a key-off state and right after it is determined by deterioration determination section 22 that the SOC of battery 13 is in predetermined range R1, notification control section 32 performs control of notifying that control will be performed to discharge battery 13. Notification control section 32, for example, lights up a lamp (warning lamp) provided on a meter panel or the like at a driver's seat and thereby notifies that control will be performed to discharge battery 13. Note that notification control section 32 may use a voice notification to notify that control will be performed to discharge battery 13.

Figure 4:
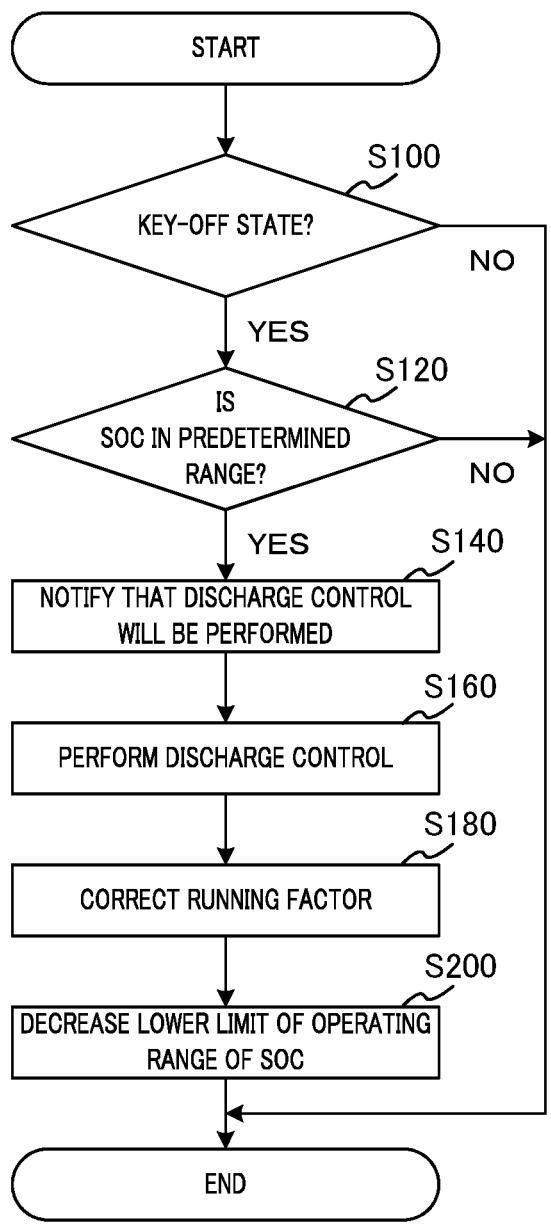
FIG. 4 is a flowchart showing an operation example of a control apparatus according to an embodiment.

Next, an operation example of control apparatus 10 according to the embodiment will be described with reference to FIG. 4.

First, key-off determination section 20 determines whether electric vehicle 1 is in a key-off state (step S100). When it is found as a result of determination that electric vehicle 1 is not in a key-off state (NO in step S100), control apparatus 10 finishes the process of FIG. 4.

On the other hand, when electric vehicle 1 is in a key-off state (YES in step S100), deterioration determination section 22 determines whether the SOC of battery 13 is in predetermined range R1 (see FIG. 3) in which battery 13 is liable to deterioration (step S120). When it is found as a result of determination that the SOC of battery 13 is not in predetermined range R1 (NO in step S120), control apparatus 10 finishes the process of FIG. 4.

On the other hand, when the SOC of battery 13 is in predetermined range R1 (YES in step S120), notification control section 32 performs control of notifying that control will be performed to discharge battery 13 (step S140).

Next, discharge control section 24 performs control of discharging battery 13 until the SOC of battery 13 falls outside predetermined range R1 (step S160).

Next, running factor correction section 28 corrects the running factor in such a way as to reduce changes in the distance to empty calculated by distance-to-empty calculation section 26 when the changes are compared before and after control is performed by discharge control section 24 to discharge battery 13 (step S180).

Finally, battery control section 30 decreases the lower limit of the operating range of the SOC of battery 13 (step S200). When the process of step S200 is completed, control apparatus 10 finishes the process of FIG. 4.

As described in detail above, according to the present embodiment, control apparatus 10 includes discharge control section 24 that performs control of discharging battery 13 until the SOC falls outside predetermined range R1 when the SOC of battery 13 is in predetermined range R1 in which battery 13 is liable to deterioration when the key of electric vehicle 1 is turned off; distance-to-empty calculation section 26 that calculates the distance to empty for electric vehicle 1 using the SOC and running factor; and running factor correction section 28 that corrects the running factor to reduce changes in the distance to empty calculated by distance-to-empty calculation section 26 when the changes are compared before and after control is performed by discharge control section 24 to discharge battery 13.

According to the present embodiment configured as described above, when discharging is controlled to reduce the time for which the SOC is in predetermined range R1 in which deterioration of battery 13 readily progresses although the actual distance to empty decreases with decreases in the SOC, as the running factor is corrected and thereby increased, changes in the distance to empty calculated and displayed by distance-to-empty calculation section 26 are reduced when compared before and after control is performed to discharge battery 13. This makes it possible to decrease the possibility that the driver will misrecognize that there is something wrong with electric vehicle 1.

Also, the embodiment described above merely illustrates a concrete example of implementing the present disclosure and is not to be interpreted as limiting the technical scope of the present disclosure. That is, the present disclosure can be implemented in various forms without departing from the spirit and scope or major features of the present disclosure.

The present application is based on Japanese Patent Application No. 2017-103498, filed on May 25, 2017, which is incorporated herein by reference.

INDUSTRIAL APPLICABILITY

The present disclosure is suitable for use in an electric vehicle control apparatus and electric vehicle that can decrease the possibility that a driver will misrecognize that there is something wrong with the electric vehicle even when battery discharge control is performed when the key of the electric vehicle is turned off.

REFERENCE SIGNS LIST

1 Electric vehicle
10 Control apparatus
11 Motor
12 Inverter
13 Battery
14 Transmission
15 Propeller shaft
16 Differential gear assembly
17 Driving wheel
20 Key-off determination section
22 Deterioration determination section
24 Discharge control section
26 Distance-to-empty calculation section
28 Running factor correction section
30 Battery control section
32 Notification control section

What is claimed is:

1. An electric vehicle control apparatus that controls an electric vehicle equipped with a chargeable and dischargeable battery and an electric motor that drives a driving wheel by being supplied with electric power charged in the battery, the electric vehicle control apparatus comprising:
   a discharge control section that performs, when a state of charge (SOC) of the battery is in a predetermined range in which the battery is liable to deterioration, in a case where a key of the electric vehicle is turned off, control of discharging the battery until the SOC falls outside the predetermined range;
   a distance-to-empty calculation section that calculates a distance to empty for the electric vehicle, multiplying the SOC and a running factor; and
   a running factor correction section that corrects and thereby increases the running factor to reduce changes in the distance to empty calculated by the distance-to-empty calculation section according to decreases in the SOC when the control of discharging the battery is performed by the discharge control section.

2. The electric vehicle control apparatus according to claim 1, wherein the running factor correction section corrects and thereby increases the running factor such that the distance to empty calculated by the distance-to-empty calculation section remains unchanged according to decreases in the SOC when the control of discharging the battery is performed by the discharge control section.

3. The electric vehicle control apparatus according to claim 1, further comprising a battery control section that decreases a lower limit of an operating range of the SOC of the battery when the control of discharging the battery is performed by the discharge control section.

4. The electric vehicle control apparatus according to claim 3, wherein, when the control of discharging the battery is performed by the discharge control section, the battery control section decreases the lower limit of the operating range of the SOC of the battery by an amount of deviation of the SOC from the predetermined range.

5. An electric vehicle, comprising the electric vehicle control apparatus according to claim 1.

* * * * *